2,822,338

QUATERNARY AMMONIUM HYDROXIDES IN FOAM RUBBER

Robert J. Hay, Fall River, Mass., assignor to The Firestone Tire & Rubber Company, Akron, Ohio, a corporation of Ohio No Drawing. Application January 8, 1954
Serial No. 403,067

8 Claims. (Cl. 260—2.5)

This invention relates to the production of foam rubber by frothing a rubber latex and more particularly to the production of a foam rubber having improved properties. This application is a continuation-in-part of my earlier copending application Serial Number 300,344, filed July 22, 1952, and now abandoned.

In the formation of foam rubber, a rubber latex containing vulcanizing ingredients, desired compounding ingredients and a gelling agent is conventionally converted to a froth or foam by whipping or beating air into the latex. The frothed latex is then introduced into a mold of a desired shape or spread on a continuously moving flat surface and allowed to set to an irreversible gel. The gelled froth is thereafter subjected to vulcanizing conditions to produce a desired foam rubber article.

The rubber latex used to produce foam rubber may be a natural rubber latex, or it may be a synthetic rubber latex, or it may be a mixture contining natural rubber and one or more synthetic rubber latices. Typical of the synthetic rubber latices is GR–S latex which is produced by aqueous emulsion polymerization of a major proportion of 1,3-butadiene and a minor proportion of styrene. Other synthetic rubber latices, also suitable for producing foam rubber, are produced by the emulsion polymerization of 1,3-butadiene or the other conjugated dienes such as piperylene, dimethyl butadiene, isoprene, 2-chloro-1,3-butadiene and similar compounds either alone or with each other or along with one or more polymerizable ethylene derivatives, for example, acrylic nitriles such as acrylonitrile, methacrylonitrile, alpha-chloro acrylonitrile; vinyl aromatic compounds such as the various styrenes, vinyl toluene, vinyl naphthalene and the like; and esters and amides of acrylic acids such as methyl acrylate, methyl methacrylate, acrylamide and other similar compounds. All of these latices including both natural rubber latex and the above synthetic rubber latices may be suitably designated as rubbery conjugated diene polymer latices. The gelling agent utilized in the production of foam rubber is advantageously a delayed action gelling agent such as an alkali metal silico fluoride, certain ammonium salts such as ammonium nitrate and ammonium sulfate or the like.

Many difficulties arise in the production of foam rubber. Slight variations in latex, compounding ingredients, maturation and general methods of handling the latex will produce widely varying results. A particular difficulty occurring in the production of foam rubber is a tendency of a frothed latex to collapse or shrink at gelation. Another particular difficulty in the production of foam rubber arises from the conventional use of zinc oxide as a vulcanization aid—zinc ions tend to form complexes which have a destabilizing effect on a latex compound. This often results in premature coagulation of the latex and consequent extensive shutdown of factory equipment for cleaning purposes.

An object, therefore, of this invention is to provide a frothed rubber latex which does not collapse at gelation. Another object is to produce a rubber latex compound which is relatively stable to zinc oxide. Another object is to provide a foam rubber having improved structure. Another object is to provide a method of producing improved foam rubber.

The above and further objects are achieved in accordance with the invention by incorporating vulcanizing ingredients, a gelling agent and a relatively small proportion of a quaternary ammonium hydroxide into a rubber latex of the type generally described in the early portion of this specification, frothing the latex, allowing the froth to set to an irreversible gel and thereafter vulcanizing the gel.

The quaternary ammonium hydroxides useful in the practice of the invention are represented structurally by the following formula:

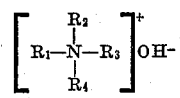

wherein at least one of $R_1$, $R_2$, $R_3$ and $R_4$ is an aliphatic hydrocarbon radical and the remainder of said $R_1$, $R_2$, $R_3$ and $R_4$ are monovalent, or two together are a divalent organic radical, or the nitrogen forms a part of a heterocyclic ring.

Many of the preferred quaternary hydroxides are those wherein one R group constitutes a long alkyl chain containing four or more and preferably six or more carbon atoms and the other R groups are methyl groups or substituted methyl groups. However, as previously indicated, many quaternary ammonium hydroxides are useful in producing the desirable results of the invention. Illustrative quaternary ammonium hydroxides which produce the results of the invention are:

Dodecyl tri (2-hydroxyethyl) ammonium hydroxide
Benzyl trimethyl ammonium hydroxide
N-cetyl pyridinium hydroxide
Cetyl dimethyl ethyl ammonium hydroxide
N-lauryl pyridinium hydroxide
Dioctadecyl dimethyl ammonium hydroxide
Lauryl imidazoline hydroxide
Cetyl trimethyl ammonium hydroxide
N-octadecyl dimethyl benzyl ammonium hydroxide
Butyl trimethyl ammonium hydroxide
Amyl trimethyl ammonium hydroxide
Dodecyl trimethyl ammonium hydroxide
Octadecenyl trimethyl ammonium hydroxide
Octadecadienyl trimethyl ammonium hydroxide
Lauryl isoquinolinium ammonium hydroxide
Hexadecyl trimethyl ammonium hydroxide
Decyl trimethyl ammonium hydroxide
4-cyclohexylbutyl trimethyl ammonium hydroxide
4-phenylbutyl trimethyl ammonium hydroxide
Dodecyl trimethyl ammonium hydroxide
Tetradecyl trimethyl ammonium hydroxide
Octadecyl trimethyl ammonium hydroxide
Octyl trimethyl ammonium hydroxide
Decyl trimethyl ammonium hydroxide
Cetyl dimethyl benzyl ammonium hydroxide
Octadecenyl ethyl dimethyl ammonium hydroxide In the practice of the invention, a single quaternary ammonium hydroxide, or if desired, a mixture of two or more different quaternary ammonium hydroxides is added in an aqueous solution or aqueous dispersion to a latex. Only relatively small amounts of the quaternary hydroxides are required to produce the desirable results of the invention. The quaternary ammonium hydroxides are ordinarily used in amounts by weight of the order of about 0.1% to about 3.0% of the dry rubber content of the latex but are effective in larger or smaller amounts.

The practice of the invention is particularly effective in preventing foam collapse at gelation, in reducing gel shrinkage, in preventing the formation of blow holes in a foam rubber article and in producing a foam rubber having an unusually fine uniform continuous structure. The practice of the invention is particularly adapted to the production of foam rubber from natural rubber—synthetic rubber latex blends containing a major proportion of natural rubber latex but is also useful in the production of foam rubber from 100% natural rubber latex, from 100% synthetic rubber latex or from blended natural rubber—synthetic rubber latex wherein the synthetic rubber represents the major constitutent.

Compounding of latices (except for the use of quaternary ammonium hydroxides) for practicing the invention is conventional. Vulcanizing ingredients include the usual vulcanizing agents (ordinarily sulfur); the usual accelerators such as zinc salts of mercaptobenzothiazole, benzothiazole disulfide, zinc diethyldithiocarbamate, piperidinium pentamethylene dithiocarbamate, tetramethylthiuram disulfide and the like; and the usual activators such as zinc oxide or other chemicals capable of producing zinc ions in solution. Conventional antioxidants and other usual compounding materials may be used if desired.

A better understanding of the invention can be had by reference to the following examples included for the purpose of illustrating but not limiting the invention. Throughout the examples, the weight of latex, whether natural or synthetic, is expressed as dry rubber weight.

Example 1

Concentrated natural rubber latex is compounded according to the following recipe:

| | Parts by weight |
|---|---|
| Latex (about 60% total solids) | 100.00 |
| Potassium oleate | 2.00 |
| Sulfur | 2.00 |
| Accelerator | 0.50 |
| Paraffin wax | 4.00 |
| Benzyl trimethyl ammonium hydroxide | 0.25 |

Four parts by weight of zinc oxide and two parts by weight of sodium silicofluoride, both based on the weight of rubber, are added to the above latex compound. The compounded latex is frothed by mechanical agitation and the froth is introduced into a suitable mold. The froth forms a stable gel after from 3 to 4 minutes and upon subjecting the gel to vulcanizing conditions an excellent foam rubber results which has a fine continuous structure. By continuous structure I mean that the foam rubber has essentially no loose ends. A latex compound containing no quaternary ammonium hydroxide but otherwise identical with the above compound exhibits complete foam collapse at gelation.

Example 2

A blend of natural and synthetic rubber latices is compounded in accordance with the invention as follows:

| | Parts by weight |
|---|---|
| Natural rubber latex (60% total solids) | 80.00 |
| GR-S latex (type V) | 20.00 |
| Potassium oleate | 2.00 |
| Sulfur | 2.00 |
| Accelerator | .50 |
| Paraffin wax | 4.00 |
| Benzyl trimethyl ammonium hydroxide | 0.25 |

The preparation of the above compound, the addition of zinc oxide and sodium silicofluoride, the frothing of the compound and the gelling and vulcanizing of the resulting froth are carried out in the same manner utilized in Example 1. At gelation, an excellent firm gel results. Upon curing, an excellent foam rubber having a fine continuous structure results. Here too, a compound identical with the above compound, except that it contains no quaternary ammonium hydroxide, undergoes foam collapse at gelation.

Example 3

As another illustration of the practice of the invention, a latex compound is prepared which differs only from the compound of Example 2 in that it contains a different synthetic rubber latex. In this instance, polybutadiene latex is used in lieu of the GR-S latex of Example 2. The polybutadiene latex is produced by the polymerization of an aqueous emulsion of butadiene-1,3 at 120° F. in a rosin soap-potassium oleate system in the presence of a persulfate catalyst. This compound also, when treated with zinc oxide and sodium silicofluoride, produces after frothing and gelling a firm stable gelled froth. Upon vulcanization of the gelled froth, an excellent foam rubber results having a fine continuous structure.

Example 4

Concentrated natural rubber latex is compounded according to the following recipe:

| | Parts by weight |
|---|---|
| Latex (about 60% total solid) | 100.0 |
| Potassium oleate | 2.0 |
| Sulfur | 2.0 |
| Accelerator | 1.5 |
| Antioxidant | 1.0 |
| Tetra-ethyl ammonium hydroxide | 0.4 |

Three parts by weight of zinc oxide and 1.1 parts by weight of sodium silicofluoride, both based on the weight of rubber are added to the above latex compound. The compounded latex is frothed by suitable mechanical means and the froth is introduced into a suitable mold and allowed to gel. The froth undergoes partial collapse at gelation. A latex compound, however, containing no quaternary ammonium hydroxide but otherwise identical with the above compound exhibits complete foam collapse at gelation. The present example is an illustration of the fact that short chain quaternary ammonium hydroxides are effective in reducing foam collapse at gelation although they are not effective to entirely eliminate foam collapse as the preferred long chain quaternary ammonium hydroxides.

Example 5

An illustration of the practice of the invention with a different quaternary ammonium hydroxide is shown by the use of the following recipe:

| | Parts by weight |
|---|---|
| Natural rubber latex (60% total solids) | 100.00 |
| Potassium oleate | 2.00 |
| Sulfur | 2.00 |
| Accelerator | 1.50 |
| Antioxidant | 1.00 |
| Octadecenyl ethyl dimethyl ammonium hydroxide | 0.25 |

Three parts by weight of zinc oxide and 1.1 parts by weight of sodium silicofluoride are added to the above latex compound. The compound is then whipped to a froth and the froth is allowed to gel. The gel is quite stable. The gelled froth is then subjected to vulcanizing conditions and an excellent foam rubber having a fine continuous structure results. A latex compound containing no quaternary ammonium hydroxide but otherwise identical with the above compound exhibits complete foam collapse at gelation.

Example 6

As an illustration of the practice of the invention with a still different quaternary ammonium hydroxide another latex compound is prepared which differs only from the compounds used in Examples 4 and 5 in that it contains a different quaternary ammonium hydroxide. In this instance, 0.35 part by weight of cetyl dimethyl ammonium hydroxide per 100 parts latex is used. The addition of zinc oxide and sodium silicofluoride and the frothing of the latex compound are carried out in the same manner used in Examples 4 and 5. In this instance an excellent firm gel results at gelation. After vulcanizing, a foam rubber results which has a fine continuous structure. A latex compound containing no quaternary ammonium hydroxide but otherwise identical with the above latex compound exhibits complete foam collapse at gelation.

*Example 7*

As another example of the practice of the invention with a different blend of latices the following latex compound is prepared:

| | Parts by weight |
|---|---|
| Natural rubber latex (about 60% total solids) | 80.00 |
| Polybutadiene latex[1] | 20.00 |
| Potassium oleate | 2.00 |
| Sulfur | 2.00 |
| Accelerator | 1.50 |
| Antioxidant | 1.00 |
| Cetyl dimethyl ammonium hydroxide | 0.25 |

[1] The same type of polybutadiene latex used in Example 3.

Three parts by weight of zinc oxide and 1.2 parts by weight of sodium silicofluoride are introduced into the above compound and the resulting mixture is whipped to a froth. The froth is allowed to gel and at gelation is stable and firm. Upon vulcanization, an excellent foam rubber having a fine continuous structure is obtained. A latex compound containing no quaternary ammonium hydroxide but otherwise identical with the above compound undergoes substantial surface breakdown at gelation.

*Example 8*

Another latex compound is prepared according to the same recipe used in Example 7 except for the use of a different quaternary ammonium hydroxide—octadecenyl ethyl dimethyl ammonium hydroxide. When zinc oxide and sodium silicofluoride are incorporated into this mixture and the mixture is frothed and allowed to gel in the same manner used in Example 7 the froth at gelation is quite stable. After vulcanizing a foam rubber is obtained which has an excellent fine structure. A latex compound which contains no quaternary ammonium hydroxide but is otherwise identical with the above compound exhibits substantial surface breakdown at gelation.

In the claims:

1. A method of producing a foam rubber having a particularly fine continuous structure from a rubbery conjugated diene polymer latex which comprises incorporating into said latex a fatty acid soap, vulcanizing ingredients including sulfur and zinc oxide, an alkali metal silicofluoride as a latex gelling agent and about 0.1% to about 3.0% by weight of the dry polymer content of said latex of a quaternary ammonium hydroxide having the formula

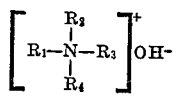

wherein the group of radicals consisting of (1) $R_1$, $R_2$, $R_3$ and $R_4$ are selected from the group consisting of alkyl, hydroxy-alkyl and hydrocarbon-substituted alkyl radicals and (2) one of said $R_1$, $R_2$, $R_3$ and $R_4$ is selected from the group consisting of alkyl and hydrocarbon-substituted alkyl radicals and the remaining three of the said $R_1$, $R_2$, $R_3$ and $R_4$ are joined together as a chain of hydrocarbons with N to form a heterocyclic ring, frothing the latex, allowing the resulting froth to set to an irreversible gel and thereafter vulcanizing the gelled froth.

2. An irreversible gelled rubbery conjugated diene polymer latex froth containing a fatty acid soap, vulcanizing ingredients including sulfur and zinc oxide, an alkali metal silicofluoride as a latex gelling agent and about 0.1% to about 3.0% by weight of the dry polymer content of said latex of a quaternary ammonium hydroxide having the formula

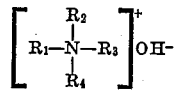

wherein the group of radicals consisting of (1) $R_1$, $R_2$, $R_3$ and $R_4$ are selected from the group consisting of alkyl, hydroxy-alkyl and hydrocarbon-substituted alkyl radicals and (2) one of said $R_1$, $R_2$, $R_3$ and $R_4$ is selected from the group consisting of alkyl and hydrocarbon-substituted alkyl radicals and the remaining three of the said $R_1$, $R_2$, $R_3$ and $R_4$ are joined together as a chain of hydrocarbons with N to form a heterocyclic ring.

3. A method of producing a foam rubber having a particularly fine continuous structure from a rubber latex containing synthetic rubbery conjugated diene polymer which comprises incorporating into said latex a fatty acid soap, vulcanizing ingredients including sulfur and zinc oxide, an alkali metal silicofluoride as a latex gelling agent and about 0.1% to about 3.0% by weight of the dry polymer content of said latex of a quaternary ammonium hydroxide having the formula

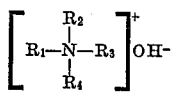

wherein the group of radicals consisting of (1) $R_1$, $R_2$, $R_3$ and $R_4$ are selected from the group consisting of alkyl, hydroxy-alkyl and hydrocarbon substituted alkyl radicals and (2) one of said $R_1$, $R_2$, $R_3$ and $R_4$ is selected from the group consisting of alkyl and hydrocarbon-substituted alkyl radicals and the remaining three of the said $R_1$, $R_2$, $R_3$ and $R_4$ are joined together as a chain of hydrocarbons with N to form a heterocyclic ring, frothing the latex, allowing the resulting froth to set to an irreversible gel and thereafter vulcanizing the gelled froth.

4. A method of producing a foam rubber having a particularly fine continuous structure from a latex mixture containing natural rubber and synthetic rubbery conjugated diene polymer, which comprises incorporating into said latex mixture a fatty acid soap, vulcanizing ingredients including sulfur and zinc oxide, an alkali metal silicofluoride as a latex gelling agent and about 0.1% to about 3.0% by weight of the dry polymer content of said latex of a quaternary ammonium hydroxide having the formula

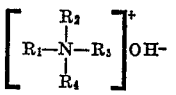

wherein the group of radicals consisting of (1) $R_1$, $R_2$, $R_3$ and $R_4$ are selected from the group consisting of alkyl, hydroxy-alkyl and hydrocarbon-substituted alkyl radicals and (2) one of said $R_1$, $R_2$, $R_3$ and $R_4$ is selected from the group consisting of alkyl and hydrocarbon-substituted alkyl radicals and the remaining three of the said $R_1$, $R_2$, $R_3$ and $R_4$ are joined together as a chain of hydrocarbons with N to form a heterocyclic ring, frothing the latex, allowing the resulting froth to set to an irreversible gel and thereafter vulcanizing the gelled froth.

5. A method of producing foam rubber having a fine continuous structure, which comprises incorporating a fatty acid soap, rubber vulcanizing ingredients including sulfur and zinc oxide, an alkali metal silicofluoride and benzyl trimethyl ammonium hydroxide into a rubbery conjugated diene polymer latex, frothing the latex, allowing the frothed latex to set to an irreversible gel and thereafter vulcanizing the gelled froth, said benzyl trimethyl ammonium hydroxide constituting about 0.1% to about 3.0% by weight of the dry polymer content of said latex.

6. A method of producing foam rubber having a fine continuous structure, which comprises incorporating a fatty acid soap, rubber vulcanizing ingredients including sulfur and zinc oxide, an alkali metal silicofluoride and cetyl trimethyl ammonium hydroxide into a rubbery conjugated diene polymer latex, frothing the latex, allowing the frothed latex to set to an irreversible gel and thereafter vulcanizing the gelled froth, said cetyl trimethyl ammonium hydroxide constituting about 0.1% to about 3.0% by weight of the dry polymer content of said latex.

7. A method of producing foam rubber having a fine continuous structure, which comprises incorporating a fatty acid soap, rubber vulcanizing ingredients including sulfur and zinc oxide, an alkali metal silicofluoride and octadecenyl ethyl dimethyl ammonium hydroxide into a rubbery conjugated diene polymer latex, frothing the latex, allowing the frothed latex to set to an irreversible gel and thereafter vulcanizing the gelled froth, said octadecenyl ethyl dimethyl ammonium hydroxide constituting about 0.1% to about 3.0% by weight of the dry polymer content of said latex.

8. A method of producing foam rubber having a fine continuous structure, which comprises incorporating a fatty acid soap, rubber vulcanizing ingredients including sulfur and zinc oxide, an alkali metal silicofluoride and tetra-ethyl ammonium hydroxide into a rubbery conjugated diene polymer latex, frothing the latex, allowing the frothed latex to set to an irreversible gel and thereafter vulcanizing the gelled froth, said tetra-methyl ammonium hydroxide constituting about 0.1% to about 3.0% by weight of the dry polymer content of said latex.

References Cited in the file of this patent

UNITED STATES PATENTS

| | | |
|---|---|---|
| 2,242,223 | Bley | May 20, 1941 |
| 2,261,439 | Kelly | Nov. 4, 1941 |
| 2,321,111 | Stamberger | June 8, 1943 |
| 2,375,089 | Ebers | May 1, 1945 |
| 2,426,430 | Binns | Aug. 26, 1947 |
| 2,580,473 | Sowa et al. | Jan. 1, 1952 |